United States Patent
Parikh et al.

(10) Patent No.: US 11,611,363 B2
(45) Date of Patent: Mar. 21, 2023

(54) CONFIGURABLE SMART RADIO MODULE

(71) Applicant: Doodle Labs (SG) PTE LTD, Somerset, NJ (US)

(72) Inventors: Nimesh D. Parikh, Mattawang, NJ (US); Claus Muschallik, Singapore (SG); Meng Huan Gan, Singapore (SG); Aaron Vinh Thanh Do, Singapore (SG); Sameer Garg, Singapore (SG)

(73) Assignee: Doodle Labs (SG) PTE LTD, Somerset, NJ (US)

( * ) Notice: Subject to any disclaimer, the term of this patent is extended or adjusted under 35 U.S.C. 154(b) by 232 days.

(21) Appl. No.: 17/274,612

(22) PCT Filed: Sep. 9, 2019

(86) PCT No.: PCT/US2019/050134
§ 371 (c)(1),
(2) Date: Mar. 9, 2021

(87) PCT Pub. No.: WO2020/055712
PCT Pub. Date: Mar. 19, 2020

(65) Prior Publication Data
US 2022/0052720 A1    Feb. 17, 2022

Related U.S. Application Data

(60) Provisional application No. 62/729,472, filed on Sep. 11, 2018.

(51) Int. Cl.
H04B 1/18 (2006.01)
H04B 1/26 (2006.01)
H04B 1/401 (2015.01)

(52) U.S. Cl.
CPC ............... *H04B 1/18* (2013.01); *H04B 1/26* (2013.01); *H04B 1/401* (2013.01)

(58) Field of Classification Search
CPC ............. H04B 1/18; H04B 1/26; H04B 1/401
See application file for complete search history.

(56) References Cited

U.S. PATENT DOCUMENTS

| | | |
|---|---|---|
| 7,107,033 B2 | 9/2006 | du Toit |
| 7,636,585 B2 | 12/2009 | Souissi et al. |
| 8,311,581 B2 | 11/2012 | Nasr |
| 8,554,154 B1 | 10/2013 | Everson et al. |
| 8,725,085 B2 | 5/2014 | Darabi et al. |
| 8,929,891 B2 | 1/2015 | Wu et al. |
| 8,995,312 B2 | 3/2015 | Balijapalli et al. |
| 9,564,932 B1 | 2/2017 | Pack et al. |

(Continued)

*Primary Examiner* — Thanh C Le
(74) *Attorney, Agent, or Firm* — Wendy W. Koba

(57) ABSTRACT

A radio module is configured to operate within a specialized frequency band, for example a band that has recently become available for use in the public domain. Superheterodyne techniques are used by a transmitter component of the radio module to frequency shift a conventional wireless data signal (e.g., used for WiFi, LTE telecommunications, etc.) into a designated band; a receiver component of the radio module is similarly configured to receive signals transmitted on the designated band and shift back into the conventional RF band (where standard components are able to further process the received signal).

7 Claims, 4 Drawing Sheets

(56) References Cited

U.S. PATENT DOCUMENTS

| | | | |
|---|---|---|---|
| 9,577,954 B2 | 2/2017 | Williams et al. | |
| 9,825,653 B2 | 11/2017 | Imana et al. | |
| 9,930,532 B2 | 3/2018 | Remmert | |
| 2011/0039503 A1 | 2/2011 | Hu et al. | |
| 2011/0053637 A1 | 3/2011 | Filipovic et al. | |
| 2014/0177484 A1 | 6/2014 | Balijapalli et al. | |
| 2015/0119115 A1 | 4/2015 | Bagger et al. | |
| 2016/0240073 A1* | 8/2016 | Ghazarian | H04W 4/90 |
| 2016/0381649 A1 | 12/2016 | Anthony et al. | |
| 2017/0195961 A1 | 7/2017 | Chakraborty et al. | |
| 2017/0366423 A1 | 12/2017 | Griot et al. | |
| 2018/0076524 A1 | 3/2018 | O'Driscoll | |
| 2018/0217570 A1 | 8/2018 | Shah | |
| 2018/0234946 A1 | 8/2018 | Buckley et al. | |
| 2019/0204253 A1* | 7/2019 | Yoo | H01Q 1/002 |
| 2019/0229415 A1 | 7/2019 | Le Goff et al. | |
| 2020/0274929 A1* | 8/2020 | Binder | H04L 67/12 |
| 2021/0127634 A1* | 5/2021 | Griffioen | G01S 11/02 |
| 2021/0306820 A1* | 9/2021 | Parikh | H04W 4/38 |
| 2022/0192512 A1* | 6/2022 | Horng | A61B 5/1135 |

\* cited by examiner

CONFIGURABLE SMART RADIO MODULE

CROSS-REFERENCE TO RELATED APPLICATIONS

This application claims the benefit of U.S. Provisional Application Ser. No. 62/729,472, filed Sep. 11, 2018 and herein incorporated by reference.

TECHNICAL FIELD

The present invention relates to the provision of wireless communication systems particularly configured for industrial applications with specific requirements (e.g., long distance, mobility, high data throughput, etc.) and, more particularly, to a radio module configured to operate within a designated frequency band for use by one or more mobile units in communication with a control station over a wireless link.

BACKGROUND OF THE INVENTION

Wireless communication plays a key role for connecting various sensors to the internet. Regulatory bodies in various countries are releasing additional frequency bands for meeting the ever-increasing demand for data traffic. Developers of modern wireless communication systems are working towards enabling the operation in many frequency bands. Operation in a broad frequency range and configurability requires the availability of "frequency agile" (smart) radios.

A current area of research and development is associated with the various wireless connectivity options for the Industrial Internet of Things (IIoT). While the subject of various definitions, the "Internet of Things" (IoT) is associated in general with the proposition that one "smart" device is able to communicate with another "smart" device without human interference (i.e., machine-to-machine (M2M)). Smart objects are increasingly able to tailor their response to their current environment, regardless of how complex the environment may be. The "Industrial" IoT (IIoT) is considered to be a specialized, yet prolific, portion of the IoT that is focused on M2M in manufacturing/industry environments where sensors, computers, and smart devices need to work together. The LTE and 5G public networks are increasingly considered as candidates for IIoT applications because of their easy access. However, these public cellular networks do not provide the necessary price-performance ratios. That is, since the public networks are by design shared among a large number of users, they exhibit relatively low speed, low QoS, and high latency, and in most cases are only available at high monthly recurring charges.

Thus, a need remains for a wireless communication architecture that addresses the diverse needs of the various applications/environments associated with IIoT.

SUMMARY OF THE INVENTION

The needs remaining in the prior art are addressed by the present invention, which relates to the provision of wireless communication systems particularly configured for industrial applications with specific requirements (e.g., long distance, mobility, high data throughput, etc.) and, more particularly to a radio module configured to operate within a designated frequency band for use by one or more mobile units in communication with a control station over a wireless link.

In accordance with the present invention, a radio module is configured to operate within a specialized frequency band, for example a band that has recently become available for use in the public domain. Various ones of these frequency bands have particular characteristics that make them well-suited for use in certain industrial applications. Superheterodyne techniques are used by a transmitter component of the radio module to frequency shift a conventional wireless data signal (e.g., used for WiFi, LTE telecommunications, etc.) into a designated band; a receiver component of the radio module is similarly configured to receive signals transmitted on the designated band and shift this received signal back into a conventional RF band where standard components are able to further process the received information.

In some embodiments, the inventive radio module may be further configured as a multi-channel module, using at least two different channels within the designated frequency band. For example, a second frequency channel may be defined as a back-up channel for redundancy purposes (particularly in industrial applications where a particular channel suddenly becomes noisy). In further accordance with the present invention, the center frequencies of these channels, as well as their channel size, may be software defined. Indeed, it is an advantage of the inventive radio module that relatively small-sized channels may be used (e.g., on the order of about 3 MHz) to allow for a larger number of channels to be utilized within the designated frequency band.

An exemplary embodiment of the present invention takes the form of a wireless communication radio module comprising an embedded sub-system, an RF front-end system and a controller. The embedded sub-system itself includes a plurality of sensors, a processor, and an RF transceiver. The RF transceiver is responsive to signals from the plurality of sensors to create an RF communication signal that is applied as an input to the RF front-end system. The RF front-end system provides frequency shifting to the RF communication signal into a designated frequency band associated with the wireless communication radio module for transmission as a wireless communication signal at the designated frequency band. The RF front-end system is further responsive to an incoming wireless communication signal operating at the designated frequency band for frequency-shifting the received signal back into an RF communication signal for use by the RF transceiver.

An advantage of the radio module of the present invention is that modules configured to operate at different designated frequency bands may all be formed to exhibit the same small form factor, using the same input/output configuration. Thus, a system user is able to change operations from one designated frequency band to another by switching out only the module itself, without the need to make any changes to cabling, power connections, housing size, etc.

Other and further aspects and embodiments of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
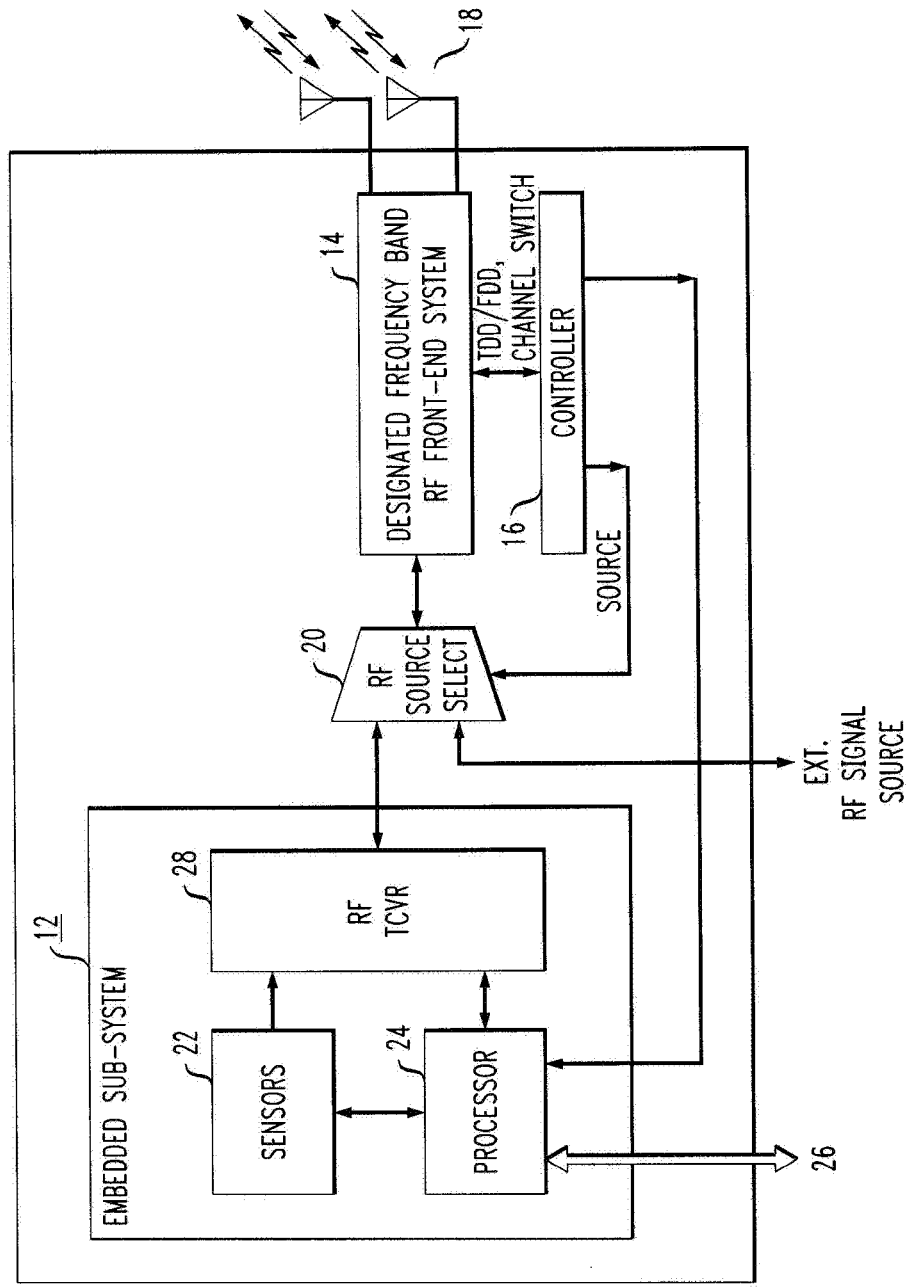
FIG. 1 is a block diagram of a smart radio module formed in accordance with the present invention

FIG. 1 is a block diagram of an exemplary configurable smart radio module 10 formed in accordance with the present invention. As shown, smart radio module 10 includes an embedded sub-system 12 that interacts with both an RF front-end system 14 and a controller 16. An antenna system 18 is used to launch the transmit signals (operating in the designated frequency band) and capture the receive signals (also operating in this same designated frequency band). In a preferred embodiment, a MIMO antenna system is used. "MIMO", referring to "multiple input/multiple output", utilizes a single transmitter to send multiple wireless signals via multiple transmit antennas. An associated receiver also utilizes multiple antenna elements, where the combination allows for sending and receiving more than one data signal simultaneously over the same radio channel by exploiting multipath propagation.

RF front-end system 14, as discussed in detail below, provides the necessary conversions between signals operating at conventional RF frequencies (i.e., those well-known frequencies associated with WiFi, LTE, or the like) and a special, designated frequency band that has been selected for use in a defined, private industrial application. These industrial applications may include, for example, one or more of the following: unmanned aerial systems (employing unmanned aerial vehicles (UAVs)/drones); unmanned ground vehicles (UGVs); public safety systems; warehouse/seaport operations; utilities/smart grid systems; autonomous mining, agriculture and forestry vehicles, etc. In one or more of these various industrial applications, smart radio-enabled devices may be controlled via wireless commands from a ground control station (or multiple ground stations. Indeed, the variety of industrial applications is ever-expanding and the ability to configure and control smart radio modules in accordance with the teachings of the present invention has been found to provide the flexibility required to meet the different needs of each application (e.g., long distance vs. high throughput speed vs. harsh environment, etc.).

As mentioned above, a smart radio module formed in accordance with the present invention is particularly configured to take advantage of using one or more frequency bands that have only recently become available for use by the general public. For example, the FCC (in collaboration with the NTIA) has now re-allocated several frequency bands for commercial wireless use. These bands include, for example, the 1690 MHz band and the 1815 MHz band, among others. The European Commission (EC) supports "rapid access to spectrum for wireless electronic communications services through more flexibility". In accordance with this statement, the EC has adopted a decision on the harmonization of the Pan-European 3400-3600 MHz frequency band for fixed, nomadic and mobile applications in the EU that offers a significant opportunity to install high-density and high-speed broadband wireless networks, which can provide innovative broadband communication services to end users. Various other frequency bands have always been "license free" and available for use, but heretofore have required the re-engineering of the various system components to properly function in these bands. For example, the various Industrial, Scientific, Medical (ISM) bands (e.g., 900 MHz band, 3500 MHz band, etc.) are available to support wireless transmissions in industrial settings, but have very disparate operating frequency bands. The flexibility offered by the inventive "plug-and-play" smart radio module addresses these multi-band problems.

Referring now to the details of FIG. 1, smart radio module 10 functions in accordance with the teachings of the present invention to enable a private radio network (such as used for an industrial application) to equip various elements within the industrial environment (for example, a plurality of UGVs), with smart radio modules, allowing these elements to communicate with a base station. RF front-end system 14, as described in detail below, is typically a "plug-in" component within module 10 and is configured to convert transmissions between a standard RF frequency and a frequency within the "designated band" being used by the associated application. The remaining components in smart radio module 10 (i.e., embedded sub-system 12, controller 16 and antenna 18) are essentially "fixed" components that are the same in form and function regardless of the frequency band at which RF front-end system 14 performs. Thus, a user of the inventive smart radio module may easily change the frequency band being used in a specific application merely by changing out RF front-end system 14, leaving the remaining components "as is". Alternatively, inasmuch as radio module 10 itself is particularly configured as "SWaP" components (i.e., minimal "space", "weight" and "power"), it is also relatively easy and straightforward to exchange one radio module for another when the need arises to use a different designated frequency band.

Also shown in the exemplary embodiment of FIG. 1 is an RF source select switch 20, positioned at the input to RF front-end system 14. RF source select switch 20 allows for the input to RF front-end system 14 to be either RF signals generated within embedded sub-system 12, or external signals (for example, signals from an LTE modem, WiFi router, etc.) associated with a separate source. Controller 16 is shown as used to provide the proper setting for RF select switch 20; that is, operating with either internal transmit/receive RF signals, or external transmit/receive RF signals.

It is a significant attribute of the present invention that radio module 10 is able to provide this separate communication link, adding to the flexibility of the applications within which the module may be used. For example, in applications where the "designated frequency band" is a shared spectrum resource, embedded sub-system 12 is able to utilize this link to communicate with an authorized Spectrum Access System (SAS) provider to receive an assigned center frequency value, as well as other operating parameters.

When smart radio module 10 is deployed as a communication unit within a "mobile" device in an industrial setting, the mobile device is typically used to collect information that is to be transmitted back to a control station (not shown) that is directing the movements and actions of the mobile device. Thus, embedded sub-system 12 is shown as including a sensor component 22, which may comprise one or more sensors that is/are able to capture information for transmission back to the control station. Information such as temperature, pressure, humidity, the presence/absence of a trace gas, digital images from an included camera, and the like, are just a few of the possible types of sensors that may be included.

A processor 24 is also included in embedded sub-system 12, and is used to process various instructions and provide command control to sensors 22. The commands for processor 24 are shown as provided by a set of external inputs 26. Processor 24 is also responsive to the data collected by sensors 22, and forwards this information as an input signal to an RF transceiver 28 also included within embedded sub-system 12. RF transceiver 28 functions in a conventional manner to create RF data transmission signals (which may include the data collected by sensors 22), forwarding these RF signals as an input to RF source selection switch 20. When applied as an input thereafter to RF front-end system 14, the RF data signals are frequency-shifted into the designated frequency band defined for use by the particular application of smart radio module 10, and transmits the wireless signal, via antenna system 18, at a frequency within this designated band.

In the receive mode, an incoming wireless signal operating within the designated band is first frequency-shifted by RF front-end system 14 back into a conventional RF frequency band, where this RF signal is then delivered to RF transceiver 28 (or, alternatively, sent via an external connection to a separate communication unit).

Figure 2:
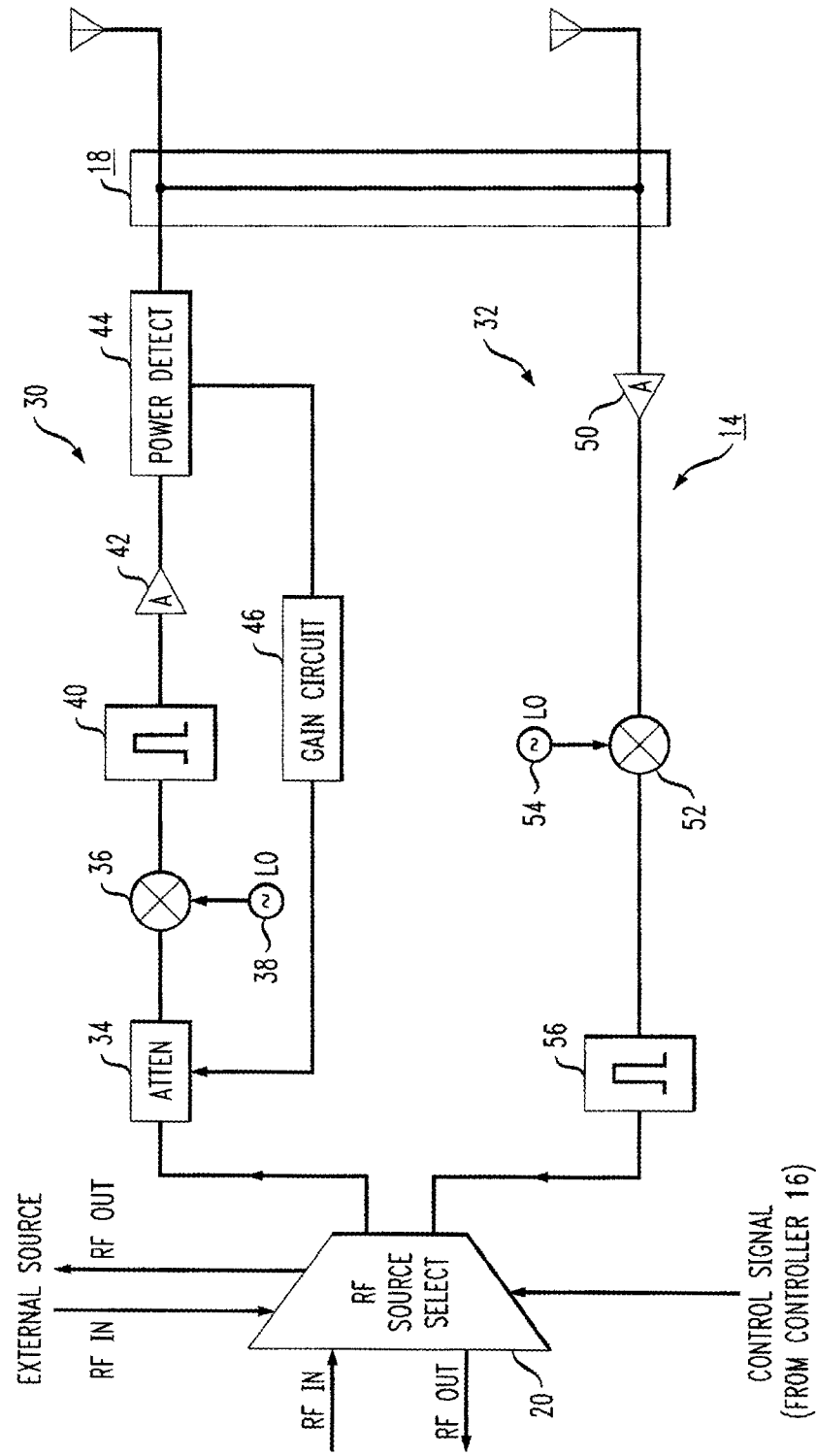
FIG. 2 shows a detailed embodiment of an exemplary RF front-end system, included within the smart radio module and configured for operation within a designated frequency band.

FIG. 2 illustrates in more detail an exemplary RF front-end system 14 as implemented in a smart radio module 10 formed in accordance with the present invention. For the sake of discussion, it will be presumed that the "designated band" for which this RF front-end system will be used is the 900 MHz ISM band (also referred to at times as the "33-centimeter band"). In use, the 900 MHz designated band ranges from 902-928 MHz, and is useful in many industrial applications since these frequencies are able to penetrate through building walls, vegetation and other obstacles.

In general, FIG. 2 illustrates RF select switch 20, used in the manner discussed above, to either utilize internal RF signals associated with RF transceiver 28 transmission/reception, or external RF signals from a separate source. RF front-end system 14 itself is illustrated in FIG. 2 as comprising a transmit section 30 and a receive section 32.

Referring now to transmit section 30, an input RF signal is first passed through an attenuator 34, which is controlled in a manner discussed below to ensure that a proper power level is used in the transmitted signal. A frequency mixer 36 is positioned at the output of attenuator 34, with the input RF signal applied as a first input to mixer 36. A local oscillator (LO) source 38 is used to provide a known reference signal as a second input to mixer 36, such that when mixed with the RF input will provide a pair of "intermediate frequency" (IF) outputs, one output being in the 900 MHz designated band for use by this particular implementation of the present invention. Thus, by utilizing a proper LO source 38, the input RF signal will be shifted into the "designated frequency band" for which this particular RF front-end system 14 is configured to function.

The output from mixer 36 is then passed through a bandpass filter 40 to provide as an output a frequency-shifted version of the RF input signal. Bandpass filter 40 is designed to exhibit a specific center frequency within the designated band, thus defining the "channel" within the designated band for this particular signal. The properties of bandpass filter 40 also control the "channel size" in terms of bandwidth used for the bandpass filter. In many industrial applications, relatively small channel sizes are preferred (on the order of, for example, about 3 MHz). Bandpass filter 40 may be configured as providing a "fixed" bandwidth for this preferred channel size or, alternatively, may be configured to allow for the user of the system to adjust the channel size for a particular purpose. Bandpass filter 40 may also be configured to exhibit a tunable center frequency, allowing for multiple frequencies within the designated band (for the 900 MHz ISM band, frequencies between 902 and 928 MHz), also determined in association with the size of the channels and the need to keep the center frequencies from overlapping.

An amplifier 42 is used to increase the transmission power of the output from bandpass filter 40 to a level acceptable for transmission in the particular industrial application. A power detector 44 is preferably included at the output of amplifier 42, and is used to provide feedback to attenuator 34, via an included gain circuit 46, which functions to adjust the operating level of attenuator 34, as necessary, to maintain an essentially uniform power output from transmitter section 30. As shown, the output from power detector 44 is then coupled into antenna system 18 for transmission. Again, antenna system 18 is illustrated in FIG. 2 as a MIMO type of system; while understanding that this is a preferably configuration, it is to be understood that the principles of the present invention directed to implementing specific, designated frequency bands for an "agile" radio module may use any suitable type of antenna arrangement.

Receive portion 32 of RF front-end system 14 is also configured to operate within the designated frequency band (here, 900 Hz ISM band) and functions to receive wireless signals operating in this frequency range and convert them into standard RF signals that may be analyzed and used by conventional equipment.

As shown in FIG. 2, a received signal is first applied as an input to a low noise amplifier 50, which is used to preferentially boost the power of the designated frequency band with respect to any other spurious signal (noise) outside of this band (i.e., improving the signal-to-noise ratio for the received signal, which is typically of relatively low power). The output from LNA 50 is then applied as a first input to a mixer 52, with a second input to mixer 52 being an LO source 54 of a frequency that will provide as an output of mixer 52 a pair of IF band signals, with one of the IF bands being the desired RF signal frequency. The output from mixer 52 is thereafter passed through a bandpass filter 56 to remove the unwanted IF component from the output of mixer 52. The filtered and "frequency shifted" received signal is then provided as an input to RF select switch 20, used in the manner described above to direct the output signal in the proper direction (i.e., to RF transceiver 28 of embedded system 12, or along an external path to an LTE modem, WiFi router, or the like).

There are situations where it would be desirable to allow RF front-end system 14 to change its operating to another center frequency within the same designated frequency band. For example, if a channel being used begins to experience interference with other signals in the environment, the capability to switch to a different center frequency/channel within the designated band would be advantageous. Also, if other components configured for operation at a first center frequency fail, having "redundancy" built into RF front-end system 14 in terms of a "spare" channel is advantageous as well.

Figure 3:
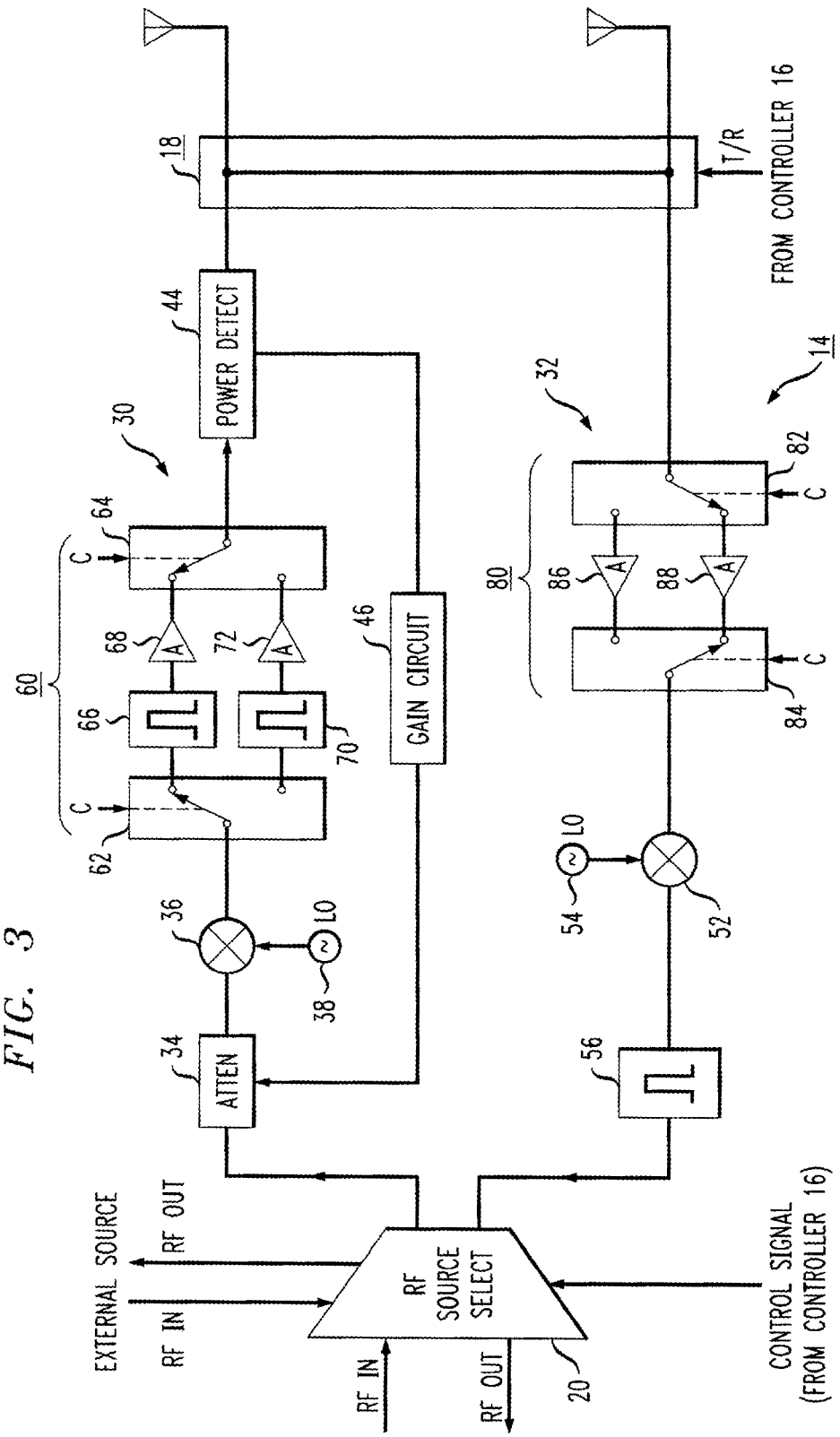
FIG. 3 illustrates an alternative embodiment of an exemplary RF front-end system, in this case designed to utilize a pair of channels within the frequency band that operate at different center frequencies.

FIG. 3 illustrates a portion of RF front-end system 14 as configured for "multi-channel" operation. It is to be understood that while the arrangement shown in FIG. 3 only describes the use of two channels, it is readily apparent that additional channels may easily be added by the inclusion of the appropriate components. Additionally, those components that remain the same and perform the same function as discussed above in association with FIG. 2 carry the same reference numerals in FIG. 3 (and will not be discussed again in detail).

For the two-channel embodiment shown in FIG. 3, a channel selection switch 60 is shown as disposed at the output of mixer 36. In particular, channel selection switch 60 includes an input 1×2 switch element 62, under the control of a "channel select" command from controller 16 (as shown in FIG. 1). An output 2×1 switch element 64 is controlled by the same "channel select" command and is used to re-introduce the proper channel signal (filtered and amplified) to power detector 44.

In accordance with this embodiment of the present invention, a pair of channel paths are coupled between input switch element 62 and output switch element 64, a first path designated as "Channel A" and a second path designated as "Channel B". For the purposes of discussion using the 900 MHz band as the "designated band", Channel A may have a center frequency of 905 MHz, for example, and Channel B may have a center frequency of 918 MHz, for example. Thus, the first path is shown as including a bandpass filter 66 centered on 905 MHz (with the defined bandwidth for the proper channel size), with bandpass filter 66 followed by an amplifier 68 that may also be configured to use with this particular channel. The second path similarly includes a bandpass filter 70 and amplifier 72. For the particular illustration in FIG. 3, it is presumed that the channel selection command from controller 16 is to use "Channel A". Thus, input switch 62 is positioned to couple the output from mixer 36 to the input of bandpass filter 66. Output switch 64 is similarly positioned along this same path, so that the output from amplifier 68 is provided as the input to power detector 44.

The receive portion of this multi-channel configuration of FIG. 3 is shown as including a receive channel selection switch 80, which is controlled by the same commands from controller 16 as transmit channel selection switch 60. Channel selection switch 80 is shown as including an input switch element 82 and an output switch element 84, where input switch element is used to direct the signal from antenna 18 along the proper channel path (again, Channel A is illustrated as the selected channel). A low noise amplifier 86 centered at the frequency of Channel A (here, 903 MHz) is included in the Channel A signal path, such that the filtered version of the received signal may be used as the input to mixer 52. Another low noise amplifier 98 is shown as positioned along the signal path for Channel B between input switch element 82 and output switch element 84.

Once the received signal at the proper channel within the designated frequency band has been filtered, it is used as an input to mixer 52 in the same manner as discussed above to shift the signal into the desired RF signal band.

Referring to FIGS. 2 and 3, it is clear that the provision of an RF front-end system 14 for a different designated frequency band (for example, the 3400 MHz ISM band) requires only the use of a different pair of LO sources and different bandpass filters. The overall architecture and operation of the transmitter and receiver portions of the RF front-end system remain essentially the same. Thus, an advantage of the smart radio module of the present invention that a given module 10 may be used in different applications merely by "switching out" one RF front-end system 14 for another. That is, a plurality of RF front-end systems 14 may be formed, each configured for use in a different designated frequency band, and a system administrator may change the frequency band at which an application is communicating merely by changing out the "pluggable" RF front-end system. The connections to RF select switch 20, controller 16, and antennas 18 remain the same for each application.

Alternatively, as mentioned above, given the "SWaP optimized" configuration of radio module 10, it is also possible (and at times, perhaps easier) to exchange one radio module for another when a particular industrial application changes operation to a different designated frequency band.

Figure 4:
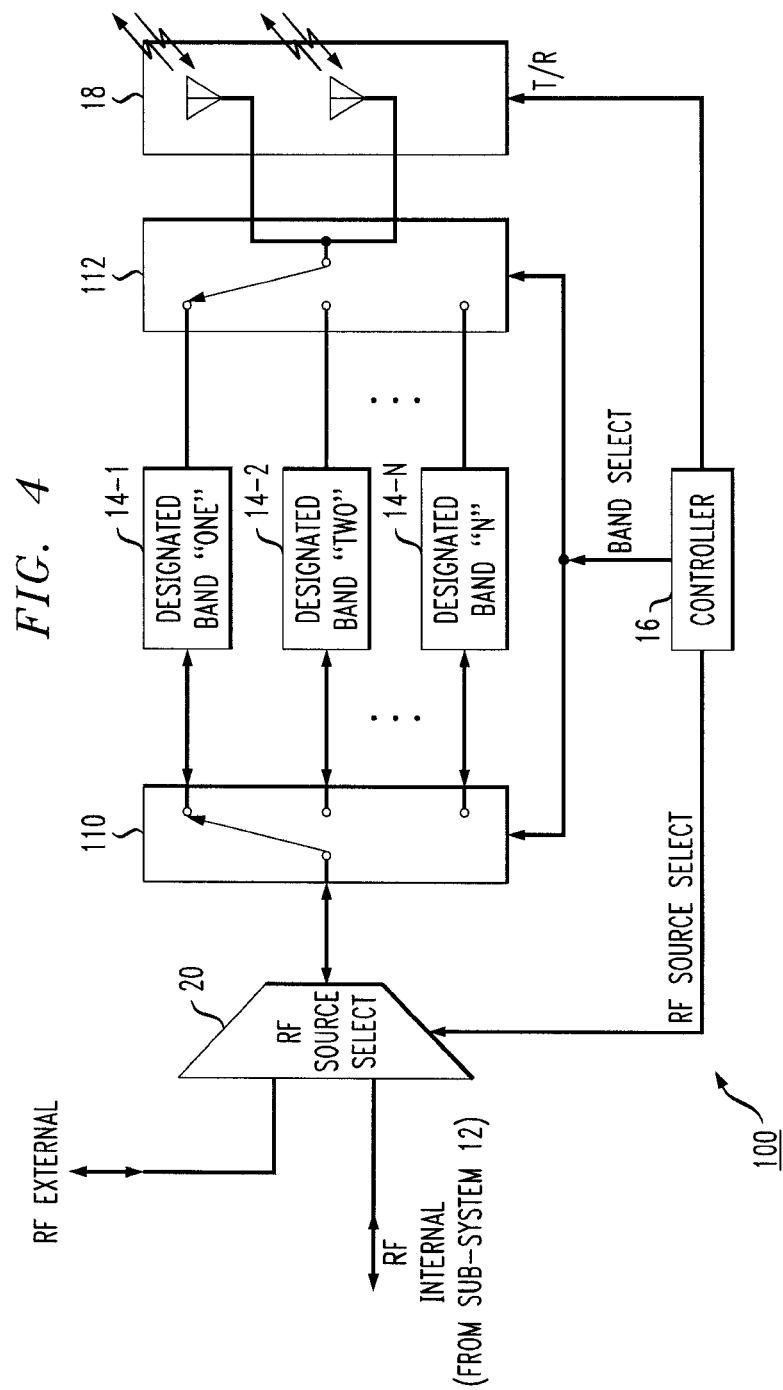
FIG. 4 shows yet another embodiment of the present invention, in this case where a smart radio module includes a plurality of RF front-end systems, each designed to operate in a different designated frequency band.

Additionally, there may be applications where several "designated bands" are to be used in a specific private network installation. In this case, a smart radio module 100 formed in accordance with the principles of the present invention and shown in FIG. 4, is arranged to comprise a plurality of separate RF front-end systems 14-1-14-N, each configured for a specific designated frequency band in the manner described above. Similar to the configurations described above, smart radio module 100 includes RF source select switch 20, providing optional sources of RF signals from either embedded system 12, or an external source. In this case, the output from RF source select switch 20 is provided as an input to a designated band select switch 110. As dictated by a selection control signal from controller 16, smart radio module 100 is (temporarily) configured for operation at a particular designated frequency band. For example, designated band "TWO" may be in use for the moment. Designated band select switch 110 would thus be operated to connect the output from RF source select switch 20 to the input of RF front-end system 14-2, associated with designated band "TWO". An output band select switch 112 is also shown in FIG. 4, and is used to couple the signal now operating within designated frequency band "TWO" to antenna 18 (received signals are similarly handled as described above).

When the need arises to utilize a different designated frequency band (perhaps changing from an indoor industrial environment with UGVs to an outdoor industrial environment with UAVs), controller 16 may be used to switch the setting for band select switches 110, 112 to now utilize an "outdoor preferred" frequency band.

What is claimed is:
1. A wireless communication radio module comprising
an embedded sub-system comprising one or more sensors, a processor, and an RF transceiver, the RF transceiver responsive to signals from the plurality of sensors to create an RF communication signal;
an RF front-end system for frequency shifting an RF input signal into a designated frequency band associated with the wireless communication radio module for transmission as a wireless communication signal at the designated frequency band, the RF front-end system further responsive to an incoming wireless communication signal operating at the designated frequency band and frequency-shifting the received signal back into an RF communication signal;
an RF source select switch disposed between the output of the RF transceiver of the embedded sub-system and the RF front-end system, the RF source select switch also coupled to an external RF signal source, where a switch state of the RF source select switch is used to couple one of the internal RF transceiver and the external RF signal source to the RF front-end system; and
a controller coupled to the embedded sub-system, the RF front-end system and the RF source select switch, the controller providing a command input to select the switch state of the RF source select switch.

2. The wireless communication radio module as defined in claim 1 wherein the external RF signal sources is selected from a group consisting of: signals from an LTE modem, WiFi signals, RF signals in other licensed frequency bands.

3. The wireless communication radio module as defined in claim 1 wherein the RF front-end system comprises
a transmit section including a mixer and local oscillator for frequency shifting the input RF signal into the designated frequency band, the local oscillator frequency selected to shift the input RF signal into the designated frequency band; and
a receive section including a mixer and local oscillator for frequency shifting a received wireless signal at the designated frequency band into an RF signal.

4. The wireless communication radio module as defined in claim 3 wherein the module is configured to utilize multiple channels within the designated frequency band, the transmit section further including a channel selection element including a plurality of parallel signal paths, each associated with a different center frequency within the designated frequency band, with an input switch disposed between the output of the mixer and the channel selection element and an output switch disposed at the output of the channel selection element, the input and output switches directed by the controller to select a specific signal path.

5. The wireless communication radio module as defined in claim 4 wherein the module is configured to utilize a pair of channels within the designated frequency band.

6. The wireless communication radio module as defined in claim 1 wherein the RF front-end system is configured as a removable component such that a first RF front-end system operating at a first designated frequency band can be replaced by a second RF front-end system operating at a second designated frequency band.

7. The wireless communication radio module as defined in claim 1 wherein the module further comprises additional RF front-end systems disposed within the module, each configured to operate in a different designated frequency band.

\* \* \* \* \*